D. S. SCHWARTZ.
BRAKE HEAD.
APPLICATION FILED SEPT. 13, 1918. RENEWED JAN. 2, 1920.
1,349,534.
Patented Aug. 10, 1920.
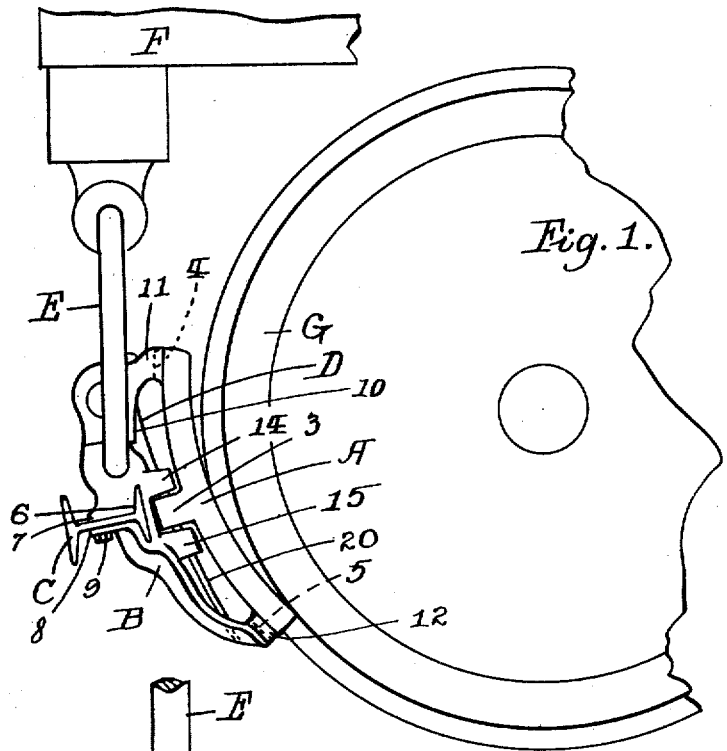
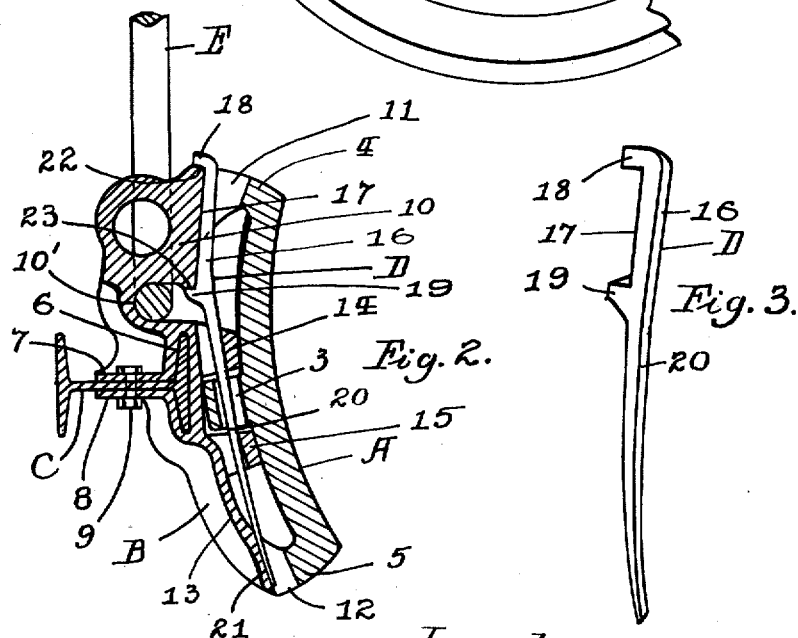
Inventor:
David S. Schwartz,
by: J. S. Bradbury.
Attorney.

UNITED STATES PATENT OFFICE.

DAVID S. SCHWARTZ, OF ST. PAUL, MINNESOTA.

BRAKE-HEAD.

1,349,534.  Specification of Letters Patent. Patented Aug. 10, 1920.

Application filed September 13, 1918, Serial No. 253,942. Renewed January 2, 1920. Serial No. 349,132.

*To all whom it may concern:*

Be it known that I, DAVID S. SCHWARTZ, a citizen of the United States, residing at St. Paul, county of Ramsey, State of Minnesota, have invented a new and useful Improvement in Brake-Heads, of which the following is a specification.

This invention relates to improvements in brake heads, and has for its primary object the production of improved means for securing brake shoes on brake blocks whereby the coupling means employed for securing said parts together cannot be removed without the use of tools or special devices, making it difficult under ordinary conditions to remove the couplings. Much annoyance and loss has occurred by unauthorized persons pilfering coupling devices which are employed for securing brake heads upon their supports and by the use of my invention this objection is reduced and practically eliminated.

In the accompanying drawing forming part of this specification, Figure 1 is a side elevation of my invention applied to a portion of a car equipment for illustrating the use of my invention; Fig. 2 is a vertical section of a brake shoe, brake block, brake beam and hanger illustrating my invention, and Fig. 3 is a perspective of the key which is used with my invention.

In the drawing let A represent a brake shoe, B what is ordinarily termed the block to which the brake shoe is detachably secured, C the brake beam, E one of the links by which the block is hung from the car body, F a portion of the car body, and G one of the car wheels with which the brake shoe is adapted to coöperate. It will be understood that the brake beam is adapted to support a block B on each of its ends, so that a pair of brake shoes may be hung by a pair of the links E in position to act upon the peripheries of a pair of car wheels G in the usual manner. The brake shoe is in the form of the usual friction face member which is adapted to be secured on the brake block B, so that the same can be detached or replaced when worn out. This brake shoe is formed with an eye member 3 on its back between its upper and lower ends and with a pair of supporting lugs 4 and 5 on its back respectively at its upper and lower ends for purposes to be hereinafter described. The brake block B has its body formed with a brake beam receiving opening 6, so that the block may be placed over the brake beam and its sides 7 and 8 clamped thereto by the holding bolt 9. The body of the block is formed with a key engaging head 10 below which is formed a horizontal channel 10' extending backwardly therebelow into which the link forming the hanger E is adapted to be received below the head member 10 to support the block. The body portion of the head extends upwardly and downwardly from the brake beam and at its upper and lower extremities is formed with pairs of forwardly projecting side lugs 11 and 12 forming channels to receive the lugs 4 and 5 on the brake shoe member A and hold the ends of the shoe member laterally. The side lugs 11 are an integral part of the head portion of the brake block, while the side lugs 12 are formed as an integral part of the downward extension 13. The forward face of the body portion of the brake block is formed with a pair of eye members 14 and 15, which are spaced upwardly apart and arranged so that when the brake shoe is placed upon the block member for use with the lugs 4 and 5 entering the channels between the lugs 11 and 12, the eye member 3 on the brake shoe will enter the space between the eye members 14 and 15 and the openings through all of the eye members 3, 14 and 15 correspond, that is are substantially in alinement. In this position the brake shoe is adapted to be locked on the brake block by the use of a spring locking key D. This key is formed with a body portion 16 having a long substantially straight surface 17. The upper and lower ends of the straight surface of the key terminates in laterally and forwardly extending shoulder pieces 18 and 19. The body portion 16 of the key member is also formed with a long depending spring shank 20, which is adapted to be inserted through the eye members 14, 3 and 15 and press by its lower end upon the bottom surface 21 of the channel formed by the side lugs 12 at the lower end of the brake block. The head portion 10 of the brake block is formed with a flat surface upon which the straight portion 17 of the body 16 of the spring key is adapted to rest and is also formed with abrupt shoulders 22 and 23 over which the shoulder members 18 and 19 lock to hold the key member against unintentional removal without the use of tools.

The channels in said block formed by said lugs 11 and 12 are sufficiently deep below the lugs 4 and 5 to freely receive the key which is held therein and the bottom of the channel formed by lugs 12 is positioned so that the lower end of the shank of the key D is pressed and the shank of the key bent to hold the body of the key tightly interlocked with the head portion 10 when the key is inserted into locking position. The key member is sufficiently strong to resist removal, except by the use of tools. Thus when the key member is inserted through the eye members on the brake shoe and brake head and the body portion of the key member is locked into engagement with the head portion of the brake block, the brake shoe is held securely in place and cannot be removed except by those having special tools for that purpose.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claim.

Having described my invention, what I claim as new and desire to protect by Letters Patent is:

A brake head, comprising, in combination, a brake shoe, a block upon which said shoe is adapted to be supported, said shoe and block being formed with projections having substantially alined openings and a key pin having a shank passing through said openings, said block being formed with a head having a flat face and with channels in its upper and lower end, which face each other to receive portions of said shoe, and said key having a body passed through said upper channel and formed with a flat face and forwardly projecting shoulders at the ends of said face which are adapted to engage said head with the faces on said key and head coinciding when said key is fully inserted in position to lock said shoe upon said head, said key having its lower end projecting into said lower channel and the projections on said head being arranged so as to bend the shank of said key to urge the key into tight interlocking engagement with said head.

In testimony whereof, I have signed my name to this specification.

DAVID S. SCHWARTZ.